United States Patent
Takase et al.

(10) Patent No.: US 10,554,104 B2
(45) Date of Patent: Feb. 4, 2020

(54) STARTER (71) Applicant: Mitsubishi Electric Corporation, Tokyo (JP)

(72) Inventors: Shintaro Takase, Tokyo (JP); Masafumi Shigeuchi, Tokyo (JP); Hidekazu Katayama, Tokyo (JP); Hirofumi Miyoshi, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 172 days.

(21) Appl. No.: 15/309,526

(22) PCT Filed: Oct. 21, 2014

(86) PCT No.: PCT/JP2014/077905
§ 371 (c)(1),
(2) Date: Nov. 8, 2016

(87) PCT Pub. No.: WO2016/063338
PCT Pub. Date: Apr. 28, 2016

(65) Prior Publication Data
US 2017/0187268 A1    Jun. 29, 2017

(51) Int. Cl.
| H02K 13/10 | (2006.01) |
| F02N 11/08 | (2006.01) |
| H01R 39/24 | (2006.01) |

(52) U.S. Cl.
CPC ......... *H02K 13/10* (2013.01); *F02N 11/0859* (2013.01); *H01R 39/24* (2013.01)

(58) Field of Classification Search
CPC ...... H02K 13/10; F02N 11/0859; H01R 39/24
(Continued)

(56) References Cited

U.S. PATENT DOCUMENTS 2,515,768 A * 7/1950 Gardiner ................ H01R 39/18
                                                          310/247
3,691,542 A * 9/1972 Gabor .................... G11B 19/20
                                                          310/248
(Continued)

FOREIGN PATENT DOCUMENTS

| JP | 03-071582 A | 3/1991 |
| JP | 2002-027711 A | 1/2002 |

(Continued)

OTHER PUBLICATIONS

Communication dated Aug. 1, 2017, issued by the Japanese Patent Office in counterpart Japanese Application No. 2016-554968.

(Continued)

*Primary Examiner* — Terrance L Kenerly
(74) *Attorney, Agent, or Firm* — Sughrue Mion, PLLC; Richard C. Turner (57) ABSTRACT

The invention includes a stator disposed inside a yoke, an armature supported inside the stator, a commutator connected to the armature and having a sliding surface in an outer peripheral portion, and a brush disposed opposing the commutator and having a sliding contact surface that comes into sliding contact with the sliding surface of the commutator, wherein the brush has a first member, and a second member with an electrical resistance value higher than that of the first member, the first member is disposed on an entrance side and the second member on an exit side with respect to a direction of rotation of the commutator, and the sliding contact surface of the brush is such that an inclined portion that inclines toward the entrance side with respect to the direction of rotation of the commutator is formed in the first member.

7 Claims, 6 Drawing Sheets

(58) Field of Classification Search
USPC .......................................................... 310/245
See application file for complete search history.

(56) References Cited

U.S. PATENT DOCUMENTS

| | | | | |
|---|---|---|---|---|
| 5,387,831 | A | * | 2/1995 | Yang ...................... H01R 39/24 310/242 |
| 5,387,832 | A | * | 2/1995 | Tanaka ................... H01R 39/24 29/597 |
| 2007/0035196 | A1 | * | 2/2007 | Sidgwick ............... H01R 39/24 310/249 |
| 2015/0061454 | A1 | * | 3/2015 | Bohr ...................... H02K 5/148 310/242 |

FOREIGN PATENT DOCUMENTS

| | | |
|---|---|---|
| JP | 2007-282362 A | 10/2007 |
| JP | 2008-099438 A | 4/2008 |
| JP | 2010-098883 A | 4/2010 |
| JP | 2012-175760 A | 9/2012 |
| JP | 2014-171304 A | 9/2014 |

OTHER PUBLICATIONS

Communication dated May 9, 2017 issued by the Japanese Patent Office in counterpart application No. 2016-554968.
Communication dated Apr. 17, 2018 from the European Patent Office in counterpart European application No. 14904219.4.
International Search Report of PCT/JP2014/077905, dated Jan. 20, 2015 [PCT/ISA/210].
Written Opinion of PCT/JP2014/077905, dated Jan. 20, 2015 [PCT/ISA/237].
Communication dated Mar. 30, 2018, from State Intellectual Property Office of the P.R.C. in counterpart application No. 201480082709.9.
Office Action dated Jun. 14, 2018 from the State Intellectual Property Office of the P.R.C. in counterpart application No. 201480082709.9, 13 pages with translation.

* cited by examiner

STARTER

This is a National Stage of International Application No. PCT/JP2014/077905 filed Oct. 21, 2014, the contents of all of which are incorporated herein by reference in their entirety.

TECHNICAL FIELD

The present invention relates to a starter that starts an engine, and in particular, relates to a starter having a multilayer brush of differing electrical resistance values.

BACKGROUND ART

In recent years, vehicles in which an engine is mounted are such that there has been an increase in vehicles for which an idling reduction system is employed, with an object of improving fuel efficiency and the like. An idling reduction system is a system whereby the engine is automatically stopped in a case in which engine output is unnecessary, such as a halt due to stopping at a traffic light or in a traffic jam, and the engine is automatically restarted by a starter when engine output becomes necessary because of a starting operation by a driver.

Starting of an engine using an existing starter is carried out only by starting driving, but starting of an engine in a vehicle for which an idling reduction system is employed is also carried out while driving, such as at a halt due to stopping at a traffic light or in a traffic jam. Because of this, starting of the engine is carried out in a state wherein power is being supplied from a battery to another vehicle-mounted electrical part (for example, a satellite navigation system, a car audio, or a car air conditioner). Therefore, an inrush current momentarily flows to the starter when the engine is started, because of which battery voltage is momentarily reduced noticeably, and the supply of power to another electrical part momentarily stops.

Also, owing to an idling reduction system being employed, requirements with respect to starter lifespan are increasing. Starter lifespan is mainly determined by brush abrasion. Commutation sparks generated when a brush and commutator slide together are a main factor in brush abrasion. Therefore, a multilayer brush in which a multiple of resistance members of differing electrical resistance values are provided is used with an object of restricting commutation sparks (for example, refer to PTL 1).

CITATION LIST

Patent Literature

PTL 1: JP-A-2007-282362

SUMMARY OF INVENTION

Technical Problem

However, an existing multilayer brush has variation in part dimension, because of which a commutator radius and an R-form provided on a brush sliding surface cannot be of exactly the same form, and the brush is in a state wherein only a low resistance member is in sliding contact with the commutator. Because of this, starter internal resistance is low, and the inrush current is large, from the brush being new until abrasion advances and a high resistance member starts to come into sliding contact. Therefore, battery voltage momentarily decreases owing to the inrush current flowing to the starter when there is an idling reduction system, and the function of another electrical part may be lost.

The invention, having been contrived in order to resolve the heretofore described kind of problem, has an object of providing a starter, which is a starter having a multilayer brush that has a low resistance member and a high resistance member of an electrical resistance value higher than that of the low resistance member, such that the high resistance member can be reliably brought into sliding contact with a commutator from an initial state in which the brush is new, whereby an inrush current can be considerably reduced.

Solution to Problem

A starter according to the invention is characterized by including a stator disposed inside a yoke, an armature, supported inside the stator, wherein an armature coil is wrapped around an armature core, a commutator connected to the armature and having a sliding surface in an outer peripheral portion, and a brush disposed opposing the commutator and having a sliding contact surface that comes into sliding contact with the sliding surface of the commutator, wherein the brush has a first member, and a second member with an electrical resistance value higher than that of the first member, the first member is disposed on an entrance side and the second member on an exit side with respect to a direction of rotation of the commutator, and the sliding contact surface of the brush is such that an inclined portion that inclines toward the entrance side with respect to the direction of rotation of the commutator is formed in the first member.

Also, a starter according to the invention is characterized by including a stator disposed inside a yoke, an armature, supported inside the stator, wherein an armature coil is wrapped around an armature core, a commutator connected to the armature and having a sliding surface in an outer peripheral portion, and a brush disposed opposing the commutator and having a sliding contact surface that comes into sliding contact with the sliding surface of the commutator, wherein the brush has a first member, and a second member with an electrical resistance value higher than that of the first member, the brush is stacked with respect to a direction of rotation of the commutator, and the sliding contact surface of the brush is such that a width of the second member is greater than a width of the first member.

Advantageous Effects of Invention

According to the starter of the invention, an inclined portion that inclines toward an entrance side with respect to a direction of rotation of a commutator is formed in a low resistance member of a sliding contact surface of a brush, because of which a high resistance member and the commutator can reliably be brought into sliding contact in an initial state wherein the brush is a new article, whereby an inrush current flowing into the starter can be considerably reduced.

Also, according to the starter of the invention, the sliding contact surface of the brush is such that a width of the high resistance member is greater than a width of the low resistance member, because of which the high resistance member and commutator can reliably be brought into sliding contact in an initial state wherein the brush is a new article. Therefore, an inrush current flowing into the starter can be considerably reduced from an initial state of a new article.

Objects, characteristics, aspects, and advantages of the invention other than those heretofore described will be further clarified by the following detailed description of the invention referring to the drawings.

DESCRIPTION OF EMBODIMENTS

Hereafter, based on the drawings, a first embodiment of the invention will be described.

In the drawings, identical reference signs indicate identical or corresponding components.

First Embodiment

Figure 1:
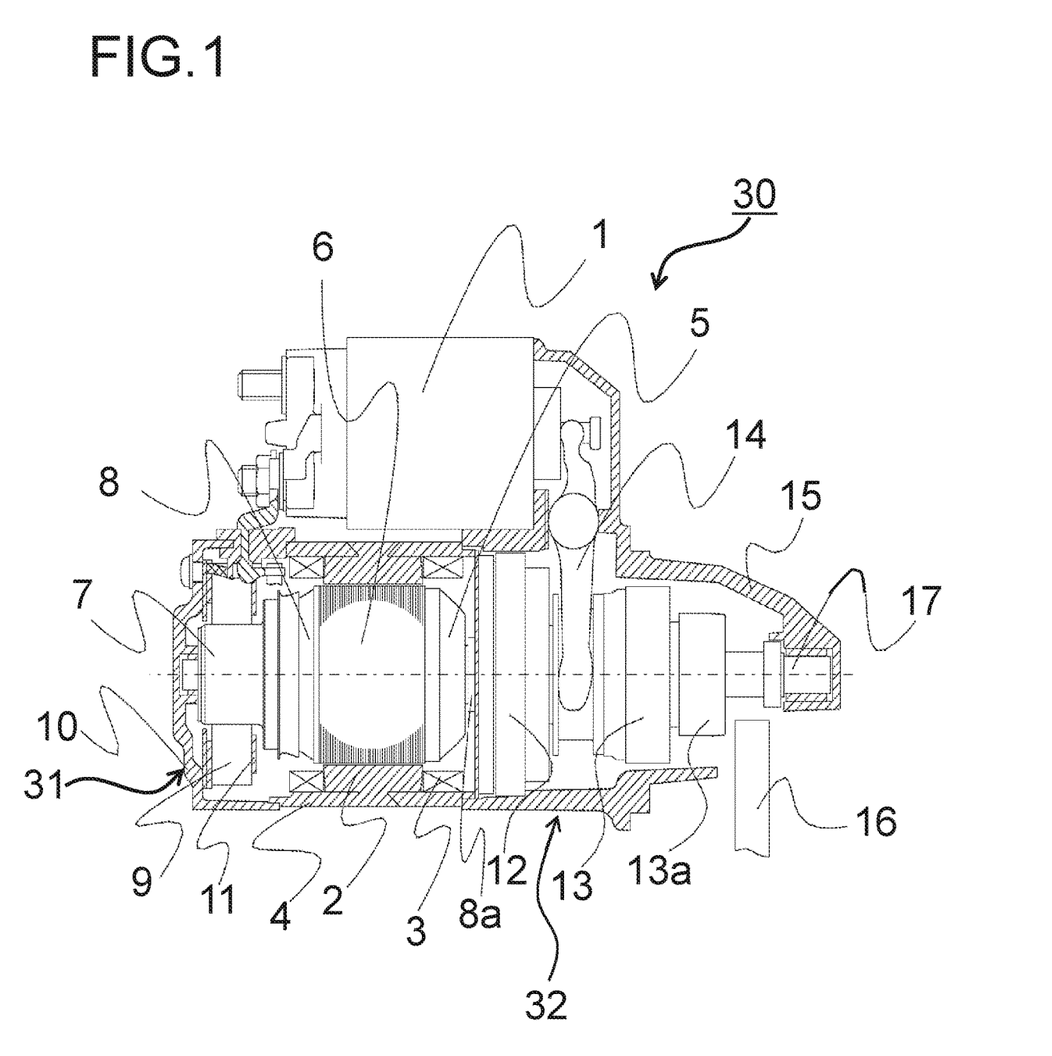
FIG. 1 is a sectional side view of a starter in a first embodiment of the invention.
Figure 2:
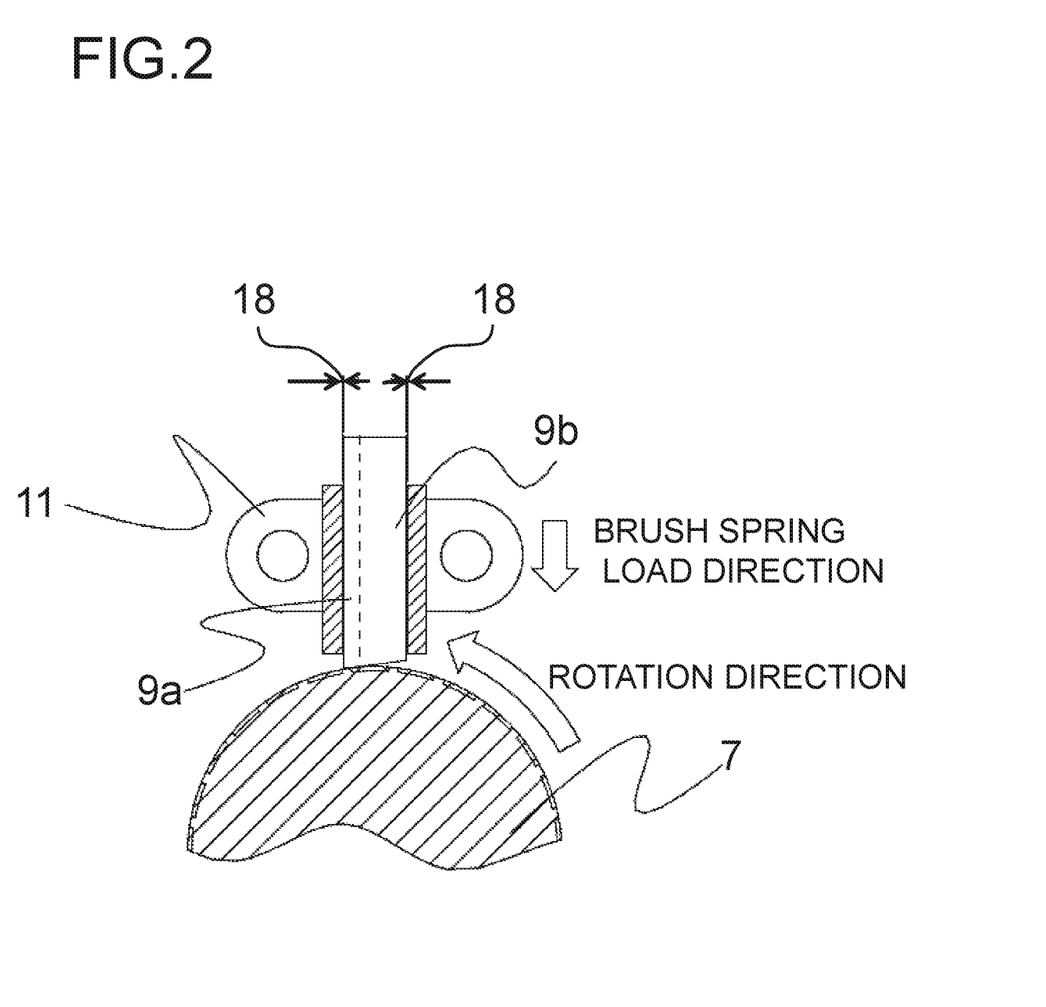
FIG. 2 is a sectional front view showing a disposition of parts on a brush periphery in the starter in the first embodiment of the invention.
Figure 3:
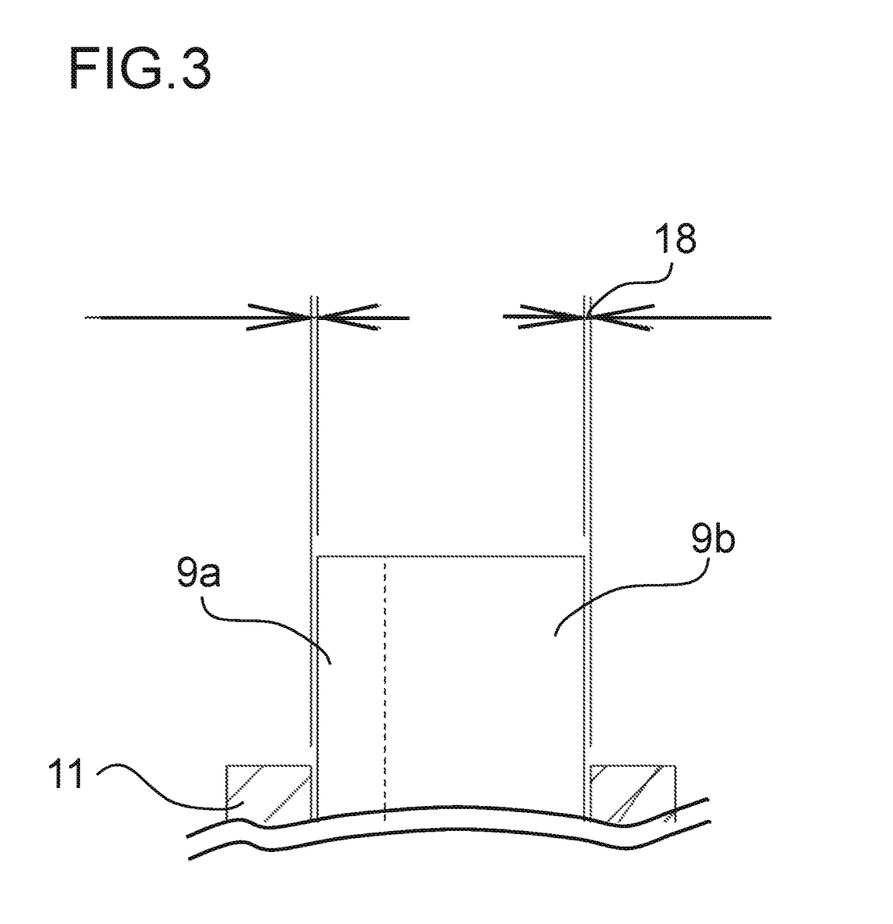
FIG. 3 is an enlarged view of FIG. 2.
Figure 4:
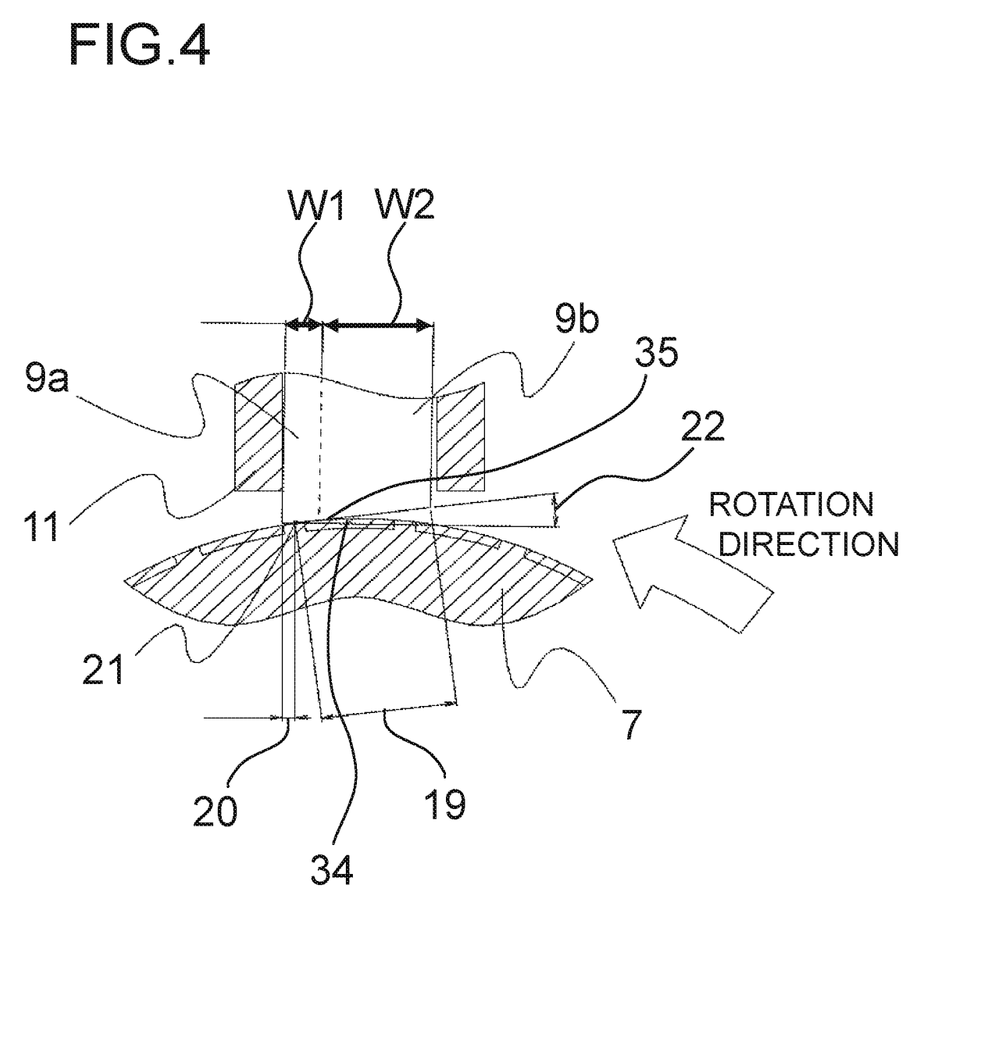
FIG. 4 is an enlarged view showing sliding contact surfaces of a brush and commutator of the starter in the first embodiment of the invention.

FIG. 1 is a sectional side view of a starter according to a first embodiment of the invention. Also, FIG. 2 shows a disposition of parts on a brush periphery in FIG. 1, and is a sectional front view of a brush that comes into sliding contact with a commutator. Furthermore, FIG. 3 is an enlarged view of FIG. 2, and is a main portion front view of a brush and brush holder. Also, FIG. 4 is an enlarged view showing sliding contact surfaces of a brush and commutator of the starter according to the first embodiment of the invention.

Firstly, based on FIG. 1, a description will be given of a structure of a starter 30 in the first embodiment. As shown in FIG. 1, the starter 30 is configured of a solenoid switch 1, motor unit 31, and mechanism 32, and is installed fixed to a starter housing 15 of the starter 30.

The motor unit 31 includes a yoke 4 including a stator 2 on an inner periphery thereof, an armature 8 wherein an armature coil 5 is lap wound around an armature core 6 and connected to a commutator 7, a brush 9 that comes into sliding contact with an outer peripheral surface of the commutator 7, and a brush holder 11 that is fixed to a motor housing 10 and holds the brush 9. A field coil 3 is wound around a perimeter of the stator 2 fixed on the inner periphery of the yoke 4, one end side is connected to a motor terminal of the solenoid switch 1 via a motor lead, and another end side is connected to the brush 9 on a positive potential side.

Also, the mechanism 32 includes a reduction gear 12, an overrunning clutch 13, and a lever 14. When a vehicle key switch is switched to ON or when a turn-on command is issued to the starter 30 from an ECU (Engine Control Unit), the solenoid switch 1 switches to an on-state, whereby the overrunning clutch 13 is moved to an engine ring gear 16 side via the lever 14, the stator 2 is caused to generate a magnetic field by a supply of power from a battery to the field coil 3 being started, and power is transmitted to the armature coil 5 while being rectified by the brush 9 and commutator 7, causing the motor unit 31 to generate turning force. The turning force generated is transmitted from a motor output shaft 8a via an output shaft 17 to a pinion gear 13a, reduced by the reduction gear 12.

Also, a total of four of the brush 9 are provided, two each on a positive potential side connected to the field coil 3 and a negative potential side connected to the motor housing 10 configuring a ground circuit of the motor unit 31. As shown in FIG. 2 and FIG. 3, a clearance 18 is provided between a side surface of the brush 9 and an inner side surface of the brush holder 11. The brush 9 is held by the brush holder 11 fixed to the motor housing 10 in a state having the clearance 18, which is of an extent such that movement of the brush 9 in the direction of the commutator 7 is not impeded. Because of this, a state wherein abrasion occurs in the brush holder 11 and brush 9, and the brush 9 cannot move, can be avoided, and the brush 9 can move smoothly to the commutator 7 side. Also, the brush 9 is such that a brush spring load is exerted in the commutator 7 direction by a brush spring (not shown) provided on a periphery of the brush 9 for as long as the lifespan of the brush 9, and the brush 9 and commutator 7 are constantly in a state of sliding contact for as long as the lifespan of the brush 9. Herein, the commutator 7 direction of the brush 9 is the same as the brush spring load direction shown in FIG. 2.

Also, the brush 9 is a carbon brush, and is of a multilayer structure wherein a high resistance member 9a and low resistance member 9b are stacked. Furthermore, the brush 9 is such that the low resistance member 9b is disposed on an entrance side and the high resistance member 9a on an exit side with respect to a direction of rotation of the commutator 7. Also, as shown in FIG. 4, the commutator 7 has a sliding surface 34 on an outer peripheral portion thereof, the brush 9 is disposed opposing the commutator 7, and the brush 9 has a sliding contact surface 35 that comes into sliding contact with the sliding surface 34 of the commutator 7. The sliding contact surface 35 of the brush 9 has an inclined portion 19 on the low resistance member 9b side and a flat portion 20 on the high resistance member 9a side. The inclined portion 19 of the brush 9 is formed so as to incline toward the entrance side with respect to the direction of rotation of the commutator 7.

Also, an origin 21 of the inclination of the inclined portion 19 with respect to the flat portion 20 is disposed within a range of a width W1 of the high resistance member 9a on the sliding contact surface 35 of the brush 9. Also, in order that the brush 9 cannot come into sliding contact with the commutator 7 with only the low resistance member 9b, even when considering a state wherein the brush 9 is inclined by the size of the clearance 18 in the direction of rotation of the commutator 7, and considering dimensional variation, the brush 9 is set so as to have a brush inclined portion angle 22 in a direction opposite to the direction of the commutator 7 in a range of a width W2 of the low resistance member 9b. That is, the brush 9 has the inclined portion 19 having the brush inclined portion angle 22 from the origin 21 to an end portion of the low resistance member 9b positioned on the entrance side with respect to the direction of rotation of the commutator 7.

Also, electrical resistance values of the brush 9 are such that the low resistance member 9b, and the high resistance member 9a of an electrical resistance value higher than that of the low resistance member 9b, are formed by causing the amount of copper included to differ. Also, the brush 9 is a multilayer brush, held in the brush holder 11 and stacked parallel to the direction in which the brush 9 can move. That is, the brush 9 is formed stacked in the direction of rotation of the commutator 7.

As a comparison example, an existing brush configured of two or more layers of a high resistance member and low resistance member of differing electrical resistance values, with an object of restricting commutation sparks, is such that a sliding contact R surface corresponding to a sliding surface radius R of a commutator is provided as a surface that comes into sliding contact with the commutator, but as the brush becomes abraded as a starter is used, a load is exerted in the direction of the commutator by a spring in order that the brush can constantly be in sliding contact with the commutator, and the brush moves in the commutator direction in accompaniment to the abrasion of the brush. Because of this, a clearance is provided between the brush and a brush holder holding the brush in order that movement of the brush in the commutator direction is not impeded, and when considering rattling of the brush caused by the clearance, and dimensional variation of the brush and components peripheral to the brush, the sliding surface radius R of the commutator and the sliding contact R surface cannot be of exactly the same form.

Also, when the brush is in a new state or has just started to be used, the commutator and brush come into sliding contact in only a narrow range with respect to the sliding contact surface. Also, a multilayer brush with an object of restricting commutation sparks is generally such that the width of the low resistance member is large with respect to that of the high resistance member, because of which there is a state wherein only the low resistance member comes into sliding contact with the commutator. Therefore, until the brush abrades to the form of the commutator and the high resistance member begins to come into sliding contact with the commutator, starter internal resistance is lower than the design value, because of which inrush current when the engine starts is large, and damage may be caused to another electrical part when the vehicle has an idling reduction system.

According to the starter in the first embodiment, however, the high resistance member with a high electrical resistance value can be brought into sliding contact with the commutator from an initial state of a new article wherein the brush sliding contact surface does not conform to the commutator, because of which the starter internal resistance can be equivalent to that when the high resistance member of the existing brush begins to come into sliding contact with the commutator, and inrush current when the engine starts can be reduced. Also, by providing the brush form with a flat portion and an inclined portion, there is no need to carry out an R processing after brush calcination, because of which there is an advantage in that brush manufacture becomes easier.

Second Embodiment

Figure 5:
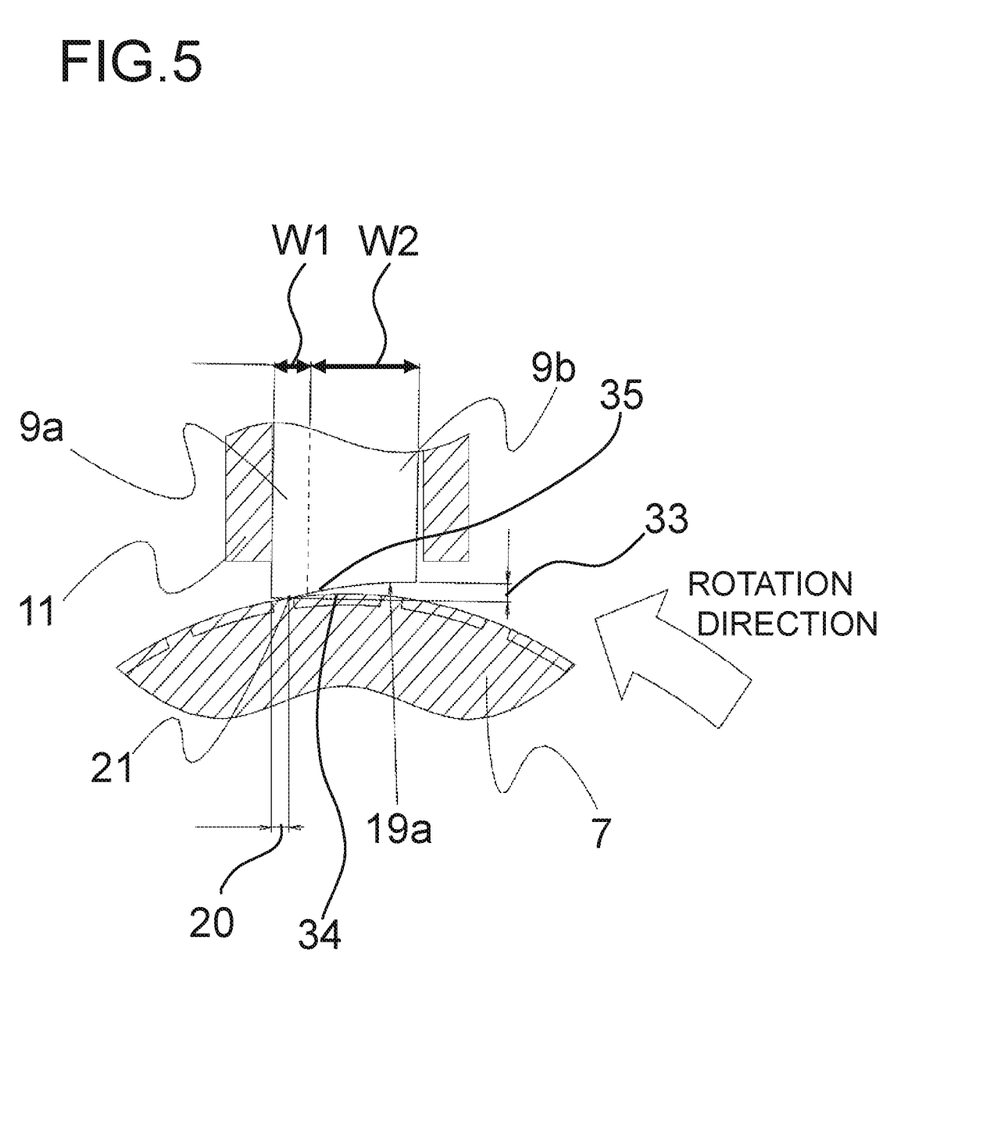
FIG. 5 is an enlarged view showing sliding contact surfaces of a brush and commutator of a starter in a second embodiment of the invention.

FIG. 5 is an enlarged view showing sliding contact surfaces of a brush and commutator in a second embodiment of the invention. In the second embodiment, the inclined portion 19 on the low resistance member 9b side of the brush 9 is shown as an R form 19a having a curved surface. The sliding contact surface 35 of the brush 9 has the R form 19a on the low resistance member 9b side and the flat portion 20 on the high resistance member 9a side, and the origin 21 of the R form 19a with respect to the flat portion 20 is disposed within the range of the width W1 of the high resistance member 9a. In the same way as in the first embodiment, the second embodiment is also such that in order that the brush 9 cannot come into sliding contact with the commutator 7 with only the low resistance member 9b, even when considering a state wherein the brush 9 is inclined in the direction of rotation of the commutator 7 within the range of the clearance 18, and considering dimensional variation, the R form is offset by the width of a gap 33 in a direction opposite to the direction of the commutator 7 within the range of the width W2 of the low resistance member 9b.

That is, the brush 9 has a curved surface having curvature from the origin 21 to an end portion of the low resistance member 9b positioned on the entrance side in the direction of rotation of the commutator 7, and has the R form 19a offset by the width of the gap 33. In the second embodiment too, the same advantages as in the first embodiment are obtained from the heretofore described structure. Furthermore, as the brush can be manufactured by utilizing an existing R processor (sliding contact surface processor), manufacture can be carried out with no need for investment in a new model, new equipment, or the like.

Third Embodiment

Figure 6:
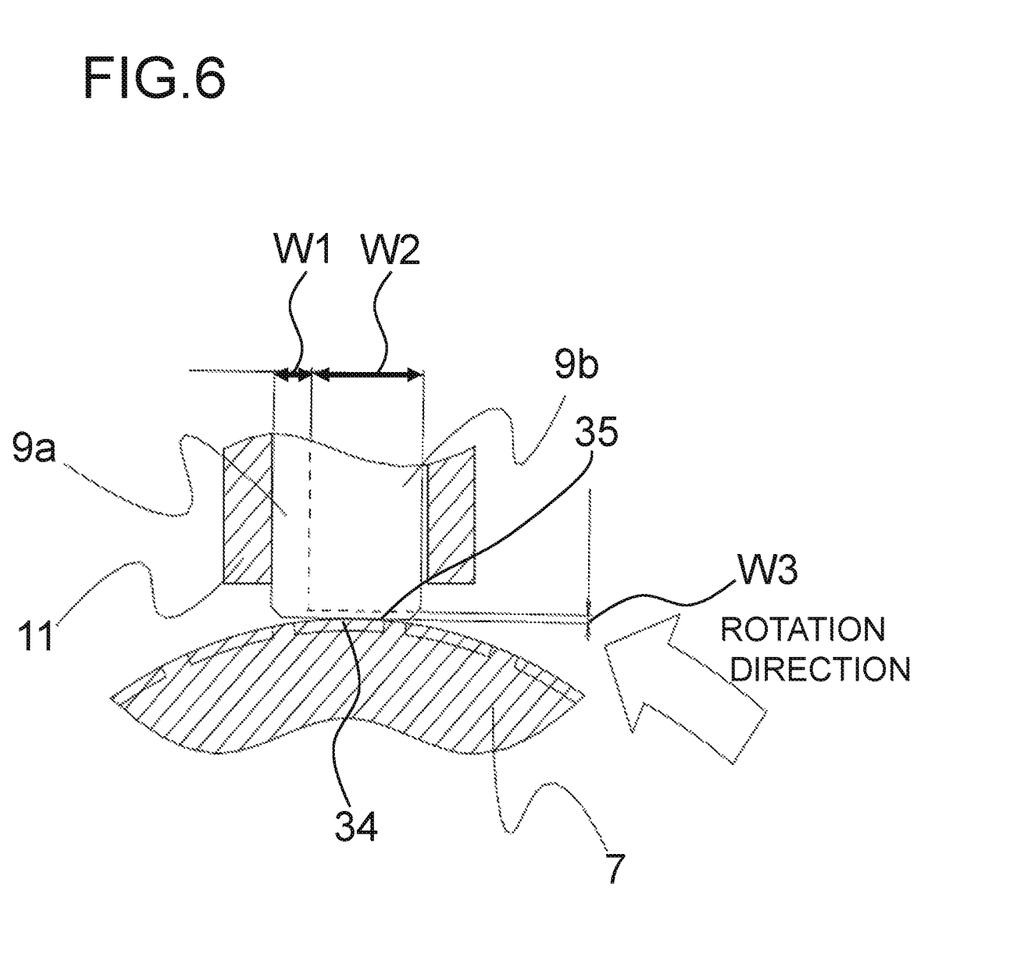
FIG. 6 is an enlarged view showing sliding contact surfaces of a brush and commutator of a starter in a third embodiment of the invention.

FIG. 6 is an enlarged view showing sliding contact surfaces of a brush and commutator in a third embodiment of the invention. In the third embodiment, the high resistance member 9a is in sliding contact with the sliding surface 34 of the commutator 7 until the brush 9 abrades and the low resistance member 9b is exposed. As shown in FIG. 6, the high resistance member 9a is formed over the whole of the sliding contact surface 35 of the brush 9. The high resistance member 9a is formed within the same width W1 as in the first embodiment, and furthermore, is formed in an L-shape having a radial direction width W3 over the whole of the sliding contact surface 35 of the brush 9.

Although an example wherein the high resistance member 9a of the brush 9 is formed over the whole of the surface that comes into sliding contact with the commutator 7 is shown in FIG. 6, the brush 9 is such that, provided that the width of the high resistance member is formed to be greater than the width of the low resistance member within a predetermined range in a direction in which the brush 9 can move from the sliding contact surface 35 of the brush 9 that comes into sliding contact with the sliding surface 34 of the commutator 7, it is not essential that the whole of the sliding contact surface 35 of the brush 9 configures the high resistance member 9a. In the third embodiment too, in the same way as in the first embodiment, the brush 9 is such that the high resistance member 9a can always come into sliding contact with the commutator 7 from an initial state of a new article wherein the brush 9 is not abraded, even when considering a state wherein the brush 9 is inclined in the direction of rotation of the commutator 7 within the range of the clearance 18, and considering dimensional variation.

By the sliding contact surface 35 of the brush 9, which comes into sliding contact with the commutator 7, having the high resistance member 9a, the high resistance member 9a and commutator 7 can reliably be brought into sliding contact and caused to slide from a state wherein the brush 9 is a new article, there is no sliding contact state wherein only the low resistance member 9b comes into sliding contact with the commutator 7 and the internal resistance of the starter 30 temporarily decreases, as is the case to date, and an inrush current flowing into the starter 30 can be reduced. Also, as the whole of the sliding contact surface 35 of the brush 9 configures the high resistance member 9a, parameters that affect the sliding contact state when the brush 9 and commutator 7 slide, such as brush dimension variation and inclination of the brush 9 due to the clearance 18 between the brush holder 11 and brush 9, can be ignored.

The starter in the first embodiment to third embodiment of the invention is not only applied to a starter having an electromagnetic field stator, but can also be applied to a starter having a permanent magnet field stator.

The embodiments of the invention can be freely combined, and each embodiment can be modified or abbreviated as appropriate, without departing from the scope of the invention.

REFERENCE SIGNS LIST

1 Solenoid switch, 2 Stator, 3 Field coil, 4 Yoke, 5 Armature coil, 6 Armature core, 7 Commutator, 8 Armature, 8a Motor output shaft, 9 Brush, 9a High resistance member, 9b Low resistance member, 10 Motor housing, 11 Brush holder, 12 Reduction gear, 13 Overrunning clutch, 13a Pinion gear, 14 Lever, 15 Starter housing, 16 Engine ring gear, 17 Output shaft, 18 Clearance, 19 Inclined portion, 19a R form, 20 Flat portion, 21 Inclined portion origin, 22 Brush inclined portion angle, W1 High resistance member width, W2 Low resistance member width, W3 High resistance member radial direction width.

The invention claimed is:

1. A starter, comprising:
a stator disposed inside a yoke;
an armature, supported inside the stator, wherein an armature coil is wrapped around an armature core;
a commutator connected to the armature and having a sliding surface in an outer peripheral portion;
a brush disposed opposing the commutator and having a sliding contact surface that comes into sliding contact with the sliding surface of the commutator; and
a brush holder that is fixed to a motor housing and holds the brush,
wherein a clearance is provided between a side surface of the brush and an inner side surface of the brush holder, the inner side surface facing the side surface of the brush,
the brush has a first member and a second member disposed adjacent to the first member and having an electrical resistance value higher than that of the first member, the first member is disposed on an entrance side and the second member is disposed on an exit side, with respect to a direction of rotation of the commutator,
the sliding contact surface of the brush has an inclined portion that is raised toward the entrance side in a direction from the second member to the first member and is formed in the first member,
the inclined portion is separated, from the commutator, by a gap forming a raise of the inclined portion at the entrance side,
an origin of the inclined portion of the brush is provided in the second member, and
the inclined portion is formed by a continuous inclination from the origin to an edge of an end portion of the first member.

2. The starter according to claim 1, wherein the sliding contact surface of the brush has a flat portion in the second member.

3. The starter according to claim 1, wherein the inclined portion has a curved surface.

4. A starter, comprising:
a stator disposed inside a yoke;
an armature, supported inside the stator, wherein an armature coil is wrapped around an armature core;
a commutator connected to the armature and having a sliding surface in an outer peripheral portion; and
a brush disposed opposing the commutator and having a sliding contact surface that comes into sliding contact with the sliding surface of the commutator,
wherein the brush has a first member and a second member disposed adjacent to the first member and having an electrical resistance value higher than that of the first member, the brush is stacked with respect to a direction of rotation of the commutator, so that the first member is disposed on an entrance side and the second member is disposed on an exit side, with respect to the direction of rotation of the commutator,
the sliding contact surface of the brush is such that a second width of a surface of the second member that is included in the sliding contact surface is greater than a first width of a surface of the first member that is included in the sliding contact surface, and
wherein the first width and the second width extend in the direction of rotation of the commutator.

5. The starter according to claim 4, wherein an entirety of the sliding contact surface of the brush is formed in the second member.

6. The starter according to claim 4, further comprising a brush holder that is fixed to a motor housing and holds the brush,
wherein a clearance is provided between a side surface of the brush and an inner side surface of the brush holder, the inner side surface facing the side surface of the brush.

7. The starter according to claim 1, wherein the sliding contact surface of the brush comprises a first contact sliding surface of the first member and a second contact sliding surface of the second member,
the first contact sliding surface of the first member has a first width,
the second contact sliding surface of the second member has a second width,
the origin of the inclined portion of the brush is provided in the second contact sliding surface of the second member, and
the inclined portion extends, from the origin, over a portion of the second contact sliding surface and a portion of the first contact sliding surface.

* * * * *